US006807414B1

United States Patent
Tiainen

(10) Patent No.: US 6,807,414 B1
(45) Date of Patent: Oct. 19, 2004

(54) DISPLAYING CALLING SUBSCRIBER NUMBER IN CALL SET-UP

(75) Inventor: Vesa Tiainen, Vantaa (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/674,657

(22) PCT Filed: May 3, 1999

(86) PCT No.: PCT/FI99/00365
§ 371 (c)(1),
(2), (4) Date: Dec. 27, 2000

(87) PCT Pub. No.: WO99/57917
PCT Pub. Date: Nov. 11, 1999

(30) Foreign Application Priority Data

May 6, 1998 (FI) .................................. 981009

(51) Int. Cl.⁷ .............................................. H04M 3/42
(52) U.S. Cl. .................................... 455/415; 455/432.1
(58) Field of Search ............................ 455/415, 432.1, 455/432.2, 433, 445, 461

(56) References Cited

U.S. PATENT DOCUMENTS

| | | | | |
|---|---|---|---|---|
| 5,878,338 A | * | 3/1999 | Alperovich et al. | 455/417 |
| 5,883,943 A | * | 3/1999 | Siddiqui | 379/142.02 |
| 5,898,917 A | * | 4/1999 | Batni et al. | 455/564 |
| 6,006,094 A | * | 12/1999 | Lee | 455/445 |
| 6,044,264 A | * | 3/2000 | Huotari et al. | 455/414.1 |
| 6,061,560 A | * | 5/2000 | Saboorian et al. | 455/415 |
| 6,085,105 A | * | 7/2000 | Becher | 455/517 |
| 6,101,382 A | * | 8/2000 | Granberg | 455/414.1 |
| 6,101,387 A | * | 8/2000 | Granberg et al. | 455/433 |
| 6,112,090 A | * | 8/2000 | Valentine | 455/445 |
| 6,122,510 A | * | 9/2000 | Granberg | 455/433 |
| 6,125,126 A | * | 9/2000 | Hallenst.ang.l | 370/522 |
| 6,233,325 B1 | * | 5/2001 | Frech et al. | 379/142.06 |
| 6,311,055 B1 | * | 10/2001 | Boltz | 455/414.1 |
| 6,343,215 B1 | * | 1/2002 | Calabrese et al. | 455/432.1 |
| 6,393,278 B1 | * | 5/2002 | Buchanan et al. | 455/426.1 |
| 6,400,947 B1 | * | 6/2002 | Bright et al. | 455/433 |
| 2002/0168968 A1 | * | 11/2002 | Glass | 455/415 |

FOREIGN PATENT DOCUMENTS

| | | | |
|---|---|---|---|
| FI | WO 97/44981 | * 11/1997 | ................. 455/415 |
| WO | WO 96/13949 | 5/1996 | |
| WO | WO 97/44981 | 11/1997 | |
| WO | WO 98/49845 | 11/1998 | |

* cited by examiner

*Primary Examiner*—William Trost
*Assistant Examiner*—James Ewart
(74) *Attorney, Agent, or Firm*—Pillsbury Winthrop LLP

(57) ABSTRACT

A method of transferring the identity of subscriber A to a second centre (VMSC) serving a roaming subscriber B. A first centre (GMSC) receives a call set-up request from subscriber A and defines the identities of the subscribers and the address of the second centre (VMSC). It then sends to a service control point (SCP) an intelligent network service initiating message. The service control point (SCP) sends to the second centre (VMSC) an indication stating the identity of subscriber A and that a call is incoming to subscriber B. The second centre (VMSC) may send corresponding information to subscriber B's mobile station (MS) and receive from it a response, which it sends to the service control point (SCP). The latter analyzes the response and issues in response thereto necessary call set-up instructions to the first centre (GMSC) which sets up the call to subscriber B's mobile station (MS), provided that said response indicates that subscriber B accepts said call. Subscriber B may also reject the call or defect it to subscriber C.

7 Claims, 1 Drawing Sheet

DISPLAYING CALLING SUBSCRIBER NUMBER IN CALL SET-UP

This application is the national phase of international application PCT/FI99/00365 filed May 3, 1999 which designated the U.S.

BACKGROUND OF THE INVENTION

The invention relates to the technology of displaying the identity (number and/or name) of a calling subscriber, i.e. subscriber A at the terminal of a called subscriber, i.e. subscriber B, while subscriber B roams in a visited network.

In the technology used in the GSM system, the number of subscriber A is transmitted to the terminal of subscriber B in call set-up. In response to the number, subscriber B can decide whether or not to answer the call. A mobile station may be able to improve this function by converting the number of subscriber A into a name, provided said name/number combination is stored in the memory of the mobile station.

One of the problems in the above arrangement is that when subscriber B is roaming in the area of a visited network, subscriber B is usually unable to see the number of subscriber A, or this at least requires special inter-operator contracts.

BRIEF DESCRIPTION OF THE INVENTION

It is thus an object of the invention to provide a method and equipment for implementing the method for transmitting the number or name of subscriber A to the centre of a visited network serving subscriber B, regard special inter-operator contracts. The objects of the invention are achieved by a method and equipment characterized by what is disclosed in the independent claims. The preferred embodiments of the invention are disclosed in the dependent claims.

The invention is based on complementing call set-up by means of intelligent network technology. An intelligent network element, e.g. a separate service control point, is provided with an intelligent network service for controlling said network element:

to receive from a gateway centre the identities of subscriber A and subscriber B and the address of a second centre serving subscriber B, and to transmit to the second centre a command to transmit the identity of subscriber A to subscriber B's mobile station via a rapid connection that does not require set-up of a speech connection, so that subscriber B does not have to pay for the call unless he answers it.

According to a preferred embodiment of the invention, the intelligent network service controls said network element to receive and analyze the response of subscriber B relayed by the second centre and, on the basis of the response, to transmit to the first centre instructions necessary for call set-up, disconnection or deflection to subscriber C.

It is an advantage of this embodiment that the identity (name and/or number) of subscriber A is visible on the display of subscriber B's mobile station regardless of special inter-operator contracts and without speech connection set-up. Subscriber B gains the most advantages from the invention, since he sees the identity of subscriber A and is able to decide in advance whether or not to answer a call. The advantages provided by the invention to operators include first of all a chance to display the identity of subscriber A without special contracts. Another advantage to an operator and to subscriber A is that subscriber B will answer at least some calls, since in prior art systems many users take no calls at all abroad because of the expensive long-distance calls.

BRIEF DESCRIPTION OF THE DRAWINGS

In the following the invention will be described in more detail in connection with preferred embodiments and with reference to the attached drawings, in which.

DETAILED DESCRIPTION OF THE INVENTION

Figure 1:
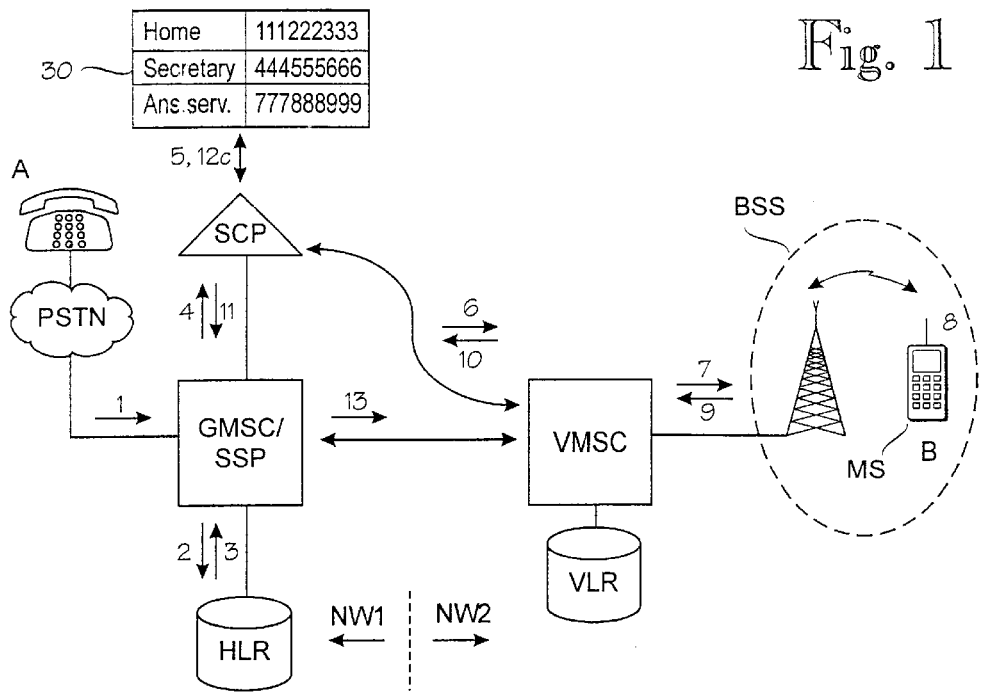
FIG. 1 shows the structure of a telecommunication system and the parts thereof which are essential to understanding the invention.

FIG. 1 shows the structure of a telecommunication system. Let us assume that a calling subscriber, i.e. subscriber A, (A) is located within the area of a Public Switched Telephone Network (PSTN). However, this only an exemplary assumption, and subscriber A could also be a subscriber in a mobile telephone network. In this example, a first centre serving subscriber A is what is known as a Gateway Mobile Service Switching Centre (GMSC). MS refers to a mobile station of a called subscriber, i.e. subscriber B, (B), NW1 to his home network, and he is roaming within the area of a visited network NW2. In the latter network he is served by a second centre VMSC comprising a Mobile Services Switching Centre MSC and a Visitor Location Register VLR (VMSC=VLR+MSC). If subscriber B wishes to transfer a call to a third party or to e.g. an answering service, said third party is called subscriber C. A network element implementing an intelligent network service is called a Service Control Point (SCP). In FIG. 1 the SCP is a separate element, but it can also be integrated into a telephone centre. A Home Location Register (HLR) comprises mobile telephone network subscriber data and information on the visitor location register VLR within whose area the mobile subscriber is located. Arrows 1 to 13 in FIG. 1 correspond to steps or messages in call set-up according to the invention and will be described in greater detail in connection with FIG. 2.

Figure 2:
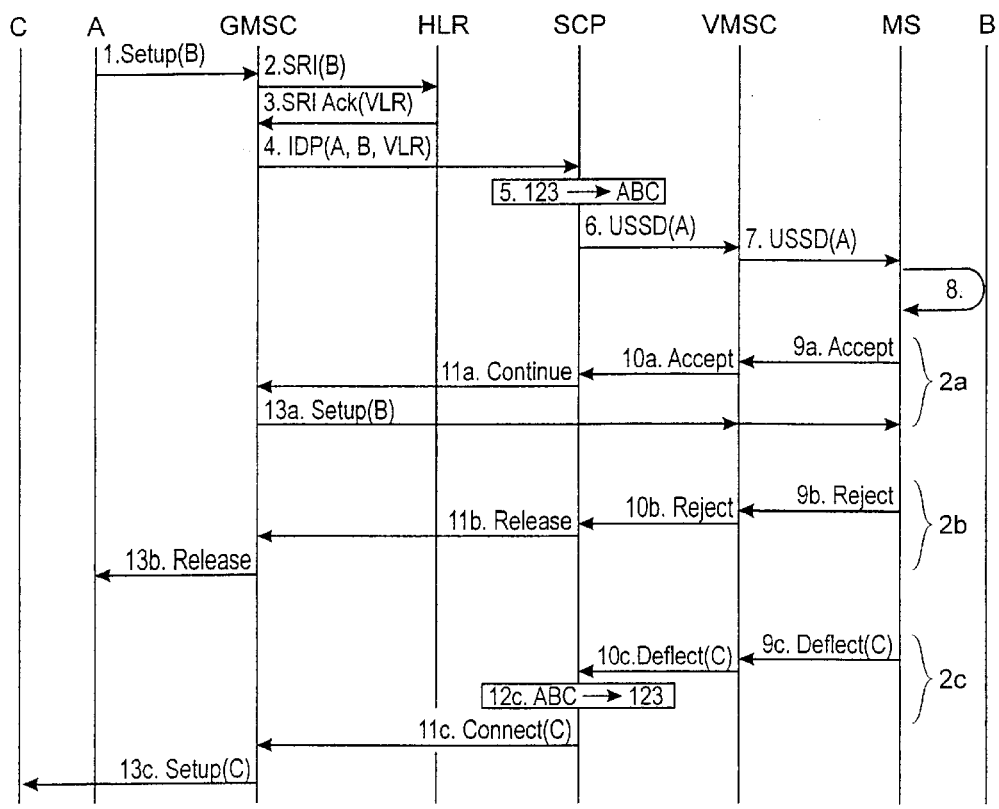
FIG. 2 shows signalling related to call set-up according to a preferred embodiment of the invention.

FIG. 2 shows signalling in call set-up according to the invention. In step 1 a call set-up message SETUP arrives at the gateway centre GMSC. As parameters the call set-up message comprises identities for subscriber A and subscriber B, e.g. ISDN or MSISDN numbers. In step 2 the GMSC sends to the home location register HLR a roaming number reservation request SEND ROUTING INFORMATION (SRI). In step 3 the HLR sends an answer SRI ACK, whose parameters include an intelligent network trigger key (Tkey) and the address VLR_Addr of the visitor location register VLR within whose area subscriber B's mobile station MS is located. The trigger key Tkey comprises an index by means of which the GMSC retrieves from its memory information required for initiating the intelligent network service. In step 4 the GMSC interrupts ordinary call set-up and inquires the intelligent network for additional instructions by sending to the service control point SCP an intelligent network service initiating message (INITIAL DETECTION POINT) IDP, whose parameters include the address of the visitor location register VLR and a service key in response to which the SCP initiates a given service.

According to a preferred embodiment, in an optional step 5, the SCP uses the number of subscriber A to search for the name of subscriber A from a subscriber database, name service or the like. Herein the concept 'the name of subscriber A' refers to any alphanumeric identity which people find easier to understand than a mere telephone number. In step 6 the SCP sends to the visitor location register VLR the identity of subscriber A. The identity may comprise the number and/or name of subscriber A. In step 7 the visitor location register VLR notifies subscriber B's mobile station MS via a base station system BSS that a call is on its way. This notification includes the identity of subscriber A.

Let us assume first that B decides to accept the call. This is denoted by reference 2a. In step 8a subscriber B indicates this by keying in a code reserved for this purpose, e.g. #55# + handset key. In step 9a this information propagates to the centre VMSC which relays it to the SCP in step 10a. In step 11a the SCP sends to the gateway centre GMSC a CONTINUE operation, whereby the GMSC continues call set-up. From here on call set-up can be continued fully in accordance with prior art. In FIGS. 1 and 2, arrow 13 indicates this call set-up known per se. It includes the following sub-steps: the GMSC sends to the home location register HLR a second SRI message including as parameter the identity of subscriber B. (In conventional call set-up this would be the first SRI). The HLR sends to the VLR a roaming number reservation request PROVIDE ROAMING NUMBER. The VLR reserves the roaming number and sends it to the HLR in a message PROVIDE ROAMING NUMBER ACK. The HLR sends to the GMSC a reply SRI ACK. The GMSC sends to the VMSC a call set-up message SETUP which includes as parameter said roaming number. Finally the VMSC sets up a call to the mobile station MS.

Let us assume next that B decides to reject the call. This is indicated by reference 2b, steps 1 to 7 being the same as in the above case. In step 8b subscriber B indicates rejection of the call by keying in a code reserved for this purpose, e.g. #66#+handset key. In step 9b this information propagates to the centre VMSC which relays it to the SCP in step 10b. In step 11b the SCP sends to the gateway centre GMSC a RELEASE CALL operation, whereby the GMSC interrupts call set-up. According to a preferred alternative, in an optional step 13b, subscriber A is provided with an audio response stating that subscriber B is not within the area of his home network and is presently unable to take the call. Subscriber A may utilize the information that subscriber B is within the area of a visited network, probably abroad. In case of urgent business, he may e.g. send a short message to subscriber A.

Let us now assume that B decides to transfer the call to another number, e.g. to his secretary. (Such selective transfer of an incoming call is called call deflection). The procedure is denoted by reference 2c, steps 1 to 7 being the same as in the first case. In step 8c subscriber B indicates deflection of an incoming call by keying in a code reserved for this purpose, e.g. #77#number of secretary# + handset key. In step 9c this information propagates to the centre VMSC, which relays it to the SCP in step 10c. In step 11c the SCP sends to the gateway centre GMSC a CONNECT operation, including as parameter the number to which the call is to be deflected. According to a preferred alternative, in an optional step 13c, subscriber A is provided with an audio response stating that the call will be deflected to another number. In step 13c the GMSC sets up the call to the number notified by subscriber B. The assumption here is that the number is a number of a public telephone network PSTN, but it may naturally also be a number of a mobile telephone network, whereby the call would be set up to this number as in steps 13a to 17a.

In steps 7 and 9a to 9c the assumption has been that information on an incoming call (including the identity of subscriber A) and the response of subscriber B are sent by means of USSD signalling (Unstructured Supplementary Service Data). In GSM phase 1 mobile stations only the mobile station may initiate USSD signalling. If the user of a mobile station keys in e.g. #555#, the mobile station sends a corresponding USSD message to the network. In phase 2 mobile stations, USSD signalling may also be initiated from the network, and consequently the above described step 7 requires a phase 2 mobile station. From the point of view of the invention, instead of USSD signalling, any other sufficiently rapid mechanism which does not require a speech connection may be used (subscriber B does not have to pay for the call if he does not answer it). The invention is applicable to phase 1 mobile stations, whereby information on an incoming call and the identity of subscriber A can be sent to them as e.g. a short message. This is, however, slower than USSD signalling.

According to still another preferred embodiment, the SCP supports call deflection in step 12c in such a way that a group of short numbers and associated alternative telephone numbers, such as secretary, colleague, home, answering service, etc., are stored user specifically in the SCP database. In FIG. 1, such a table is denoted by reference 30. In this case, in step 8c subscriber B does not have to key in the entire telephone number, only the corresponding short number. A short number may also be alphanumeric, e.g. #sec# or #answ#, whereby the call is transferred to a secretary or to an answering service. Such name/number conversion may also be reverse, i.e. conversion of the number of subscriber A into a name as was described previously in step 5. In this case, complete names are preferably stored in the conversion table 30 (e.g. "secretary"), but the identity of subscriber C in subscriber B's response is identified even when only a detectable start is keyed in (e.g. "usec" or "se").

In the above, a two-step HLR inquiry (steps 3 and 13a) was described

Conventional call set-up in a mobile communication system only comprises one HLR inquiry. The advantage of a two-step inquiry is that a roaming number is reserved only in cases when subscriber B decides to take the call. It is also feasible that a roaming number is always reserved, and the roaming number is released by time-out when subscriber B rejects the call or deflects it.

It is obvious to those skilled in the art that as technology progresses, the basic idea of the invention may be implemented in a variety of ways. Consequently, the invention and its embodiments are not restricted to the above examples but may vary within the scope of the claims.

What is claimed is:

1. A method of transferring the identity of subscriber A to a second centre serving a mobile station of subscriber B roaming in a visited network in a telecommunication system which further comprises or is connected to a first centre and an intelligent network service control point, in which method the first centre receives a call set-up request from subscriber A and in response thereto determines the identities of subscriber A and subscriber B and the address of the second centre, characterized by the first centre sending to the service control point an intelligent network service initiating message, the service control point sending to the second centre information indicating the identity of subscriber A and that a call is incoming to subscriber B, the second centre sending to subscriber B's mobile station information indicating the identity of subscriber A and that a call is incoming to subscriber B, the second centre receiving from subscriber B's mobile station a response and sending it to the service control point, and the service control point analyzing the response and issuing in response thereto necessary call set-up instructions to the first centre, which sets up a call to subscriber B's mobile station if said response indicates that subscriber B accepts said call.

2. A method as claimed in claim 1, characterized in that if said response indicates the identity of subscriber C, the first centre sets up the call to subscriber C.

3. A method as claimed in claim 2, characterized in that if the response indicates the identity of subscriber C in alphanumeric form, the service control point converts it into the number of subscriber C.

4. A method as claimed in claim 1, characterized by the service control point receiving the identity of subscriber A as a number and producing in response thereto the name of subscriber A.

5. A method as claimed in claim 1, characterized by the second centre receiving said response in the form of USSD signalling.

6. A method as claimed in claim 1, characterized by the second centre sending the identity of subscriber A in the form of USSD signalling if subscriber B's mobile station supports the USSD signalling initiated by the centre, and otherwise as a short message.

7. An intelligent network service control point, characterized by being adapted to receive from a first centre an initiating message indicating the identities of subscriber A and subscriber B, send to a second centre serving subscriber B said subscriber identities and an indication that a call is incoming to subscriber B, and analyze a response issued by subscriber B's mobile station and forwarded by the second centre and issuing in response thereto necessary call set-up instructions to the first centre, which sets up a call to subscriber B's mobile station if said response indicates that subscriber B accepts said call.

* * * * *